United States Patent
Inman et al.

(10) Patent No.: US 7,093,852 B2
(45) Date of Patent: Aug. 22, 2006

(54) INFLATOR

(75) Inventors: Reed A. Inman, Mesa, AZ (US); John S. Dunlop, Mesa, AZ (US); Christopher J. Ruf, Mesa, AZ (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 301 days.

(21) Appl. No.: 10/642,339

(22) Filed: Aug. 14, 2003

(65) Prior Publication Data

US 2005/0035580 A1 Feb. 17, 2005

(51) Int. Cl.
*B60R 21/28* (2006.01)
(52) U.S. Cl. .................................. 280/736; 280/737
(58) Field of Classification Search .............. 280/737, 280/736, 741, 742
See application file for complete search history.

(56) References Cited

U.S. PATENT DOCUMENTS

| | | | |
|---|---|---|---|
| 5,516,144 A | 5/1996 | Headley et al. | |
| 5,586,783 A * | 12/1996 | Adam et al. | 280/737 |
| 6,010,153 A * | 1/2000 | Halas et al. | 280/737 |
| 6,431,595 B1 * | 8/2002 | Swann et al. | 280/736 |
| 6,543,806 B1 * | 4/2003 | Fink | 280/737 |
| 6,705,637 B1 * | 3/2004 | Goto et al. | 280/728.2 |

FOREIGN PATENT DOCUMENTS

| | | |
|---|---|---|
| DE | 19802548 | 8/1998 |
| DE | 10064191 | 8/2001 |
| EP | 0 949 126 | 10/1999 |
| GB | 2322436 | 8/1998 |

* cited by examiner

*Primary Examiner*—David R. Dunn
(74) *Attorney, Agent, or Firm*—Tarolli, Sundheim, Covell & Tummino L.L.P.

(57) ABSTRACT

An inflator (22) includes a structure (30, 32) that defines a first chamber (50) and a second chamber (80). The first chamber (50) contains a volume of fluid under pressure and the second chamber (80) is in fluid communication with an outlet passage (76). The inflator (22) also includes a closure member (90) openable to release the fluid to flow out of the first chamber (50). An initiator (100) is actuatable to open the closure member (90). The inflator (22) further includes a filter (130) disposed in the second chamber (80). The fluid is directed from the first chamber (50) into the second chamber (80) and through the filter (130) into the outlet passage (76) upon opening of the closure member (90).

11 Claims, 2 Drawing Sheets

INFLATOR

FIELD OF THE INVENTION

The present invention relates to an apparatus for helping to protect an occupant of a vehicle. More specifically, the present invention relates to an inflator that provides inflation fluid for inflating an inflatable vehicle occupant protection device.

BACKGROUND OF THE INVENTION

It is known to inflate an inflatable vehicle occupant protection device to help protect a vehicle occupant in the event of a vehicle collision. One particular type of inflatable vehicle occupant protection device is a inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube. A filter may be provided to filter particulates from the inflation fluid provided by the inflator.

SUMMARY OF THE INVENTION

The present invention relates to an inflator that includes a structure that defines a first chamber and a second chamber. The first chamber contains a volume of fluid under pressure and the second chamber is in fluid communication with an outlet passage for directing fluid from the inflator. The inflator also includes a closure member openable to release the fluid to flow out of the first chamber. An initiator is actuatable to open the closure member. The inflator further includes a filter disposed in the second chamber. The fluid is directed from the first chamber into the second chamber and through the filter into the outlet passage upon opening of the closure member.

The present invention also relates to an inflator actuatable to provide inflation fluid for inflating an inflatable vehicle occupant protection device. The inflator includes a container portion comprising a first chamber for containing a volume of inflation fluid under pressure. A closure member is openable to release the inflation fluid to flow out of said first chamber. The inflator also includes an output portion for directing the inflation fluid into the inflatable vehicle occupant protection device. The output portion comprises a second chamber into which the inflation fluid is directed from the first chamber and an outlet passage through which the inflation fluid is directed from the second chamber into the inflatable vehicle occupant protection device. The inflator also includes a filter disposed in the second chamber. The inflation fluid is directed from the first chamber into the second and through the filter into the outlet passage upon opening of the closure member. The inflator further includes an initiator actuatable to open the closure member. The initiator is disposed in the first chamber and engages a first portion of the filter. A second portion of the filter engages a surface in the second chamber. The initiator is urged against the first portion which urges the second portion against the surface to clamp the filter in the chamber between the initiator and the surface.

The present invention further relates to an inflator actuatable to provide inflation fluid for inflating an inflatable vehicle occupant protection device. The inflator includes container means comprising a first chamber for containing a volume of inflation fluid under pressure. The container means includes a closure member openable to release the inflation fluid to flow out of the first chamber. Initiator means is actuatable to open the closure member. The inflator also includes output means for directing the inflation fluid into the inflatable vehicle occupant protection device. The output means comprises a second chamber into which the inflation fluid is directed from the first chamber and an outlet passage through which the inflation fluid is directed from the second chamber into the inflatable vehicle occupant protection device. The inflator further includes filter means disposed in the second chamber between the initiator means and a surface of the output means. A portion of the output means is deformed onto the initiator means to urge the initiator means into the second chamber to clamp the filter means between the initiator means and the surface of the output means. The inflation fluid is directed from the first chamber into the second chamber and through the filter means into the outlet passage upon opening of the closure member.

The present invention still further relates to an apparatus for helping to protect an occupant of a vehicle that has a side structure. The apparatus includes an inflatable vehicle occupant protection device that is inflatable between the side structure of the vehicle and a vehicle occupant. A container stores inflation fluid under pressure for inflating the inflatable vehicle occupant protection device. A closure member is openable to release the inflation fluid to flow from the container. Output means includes a chamber into which the inflation fluid flows from the container when the closure member is ruptured. The output means further includes an outlet passage through which the inflation flows from the chamber toward the inflatable vehicle occupant protection device. An initiator is actuatable to rupture the closure member. A filter is disposed in the chamber. The inflation fluid is directed from the container into the chamber and through the filter into the outlet passage upon opening of the closure member.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF A PREFERRED EMBODIMENT

Figure 1:
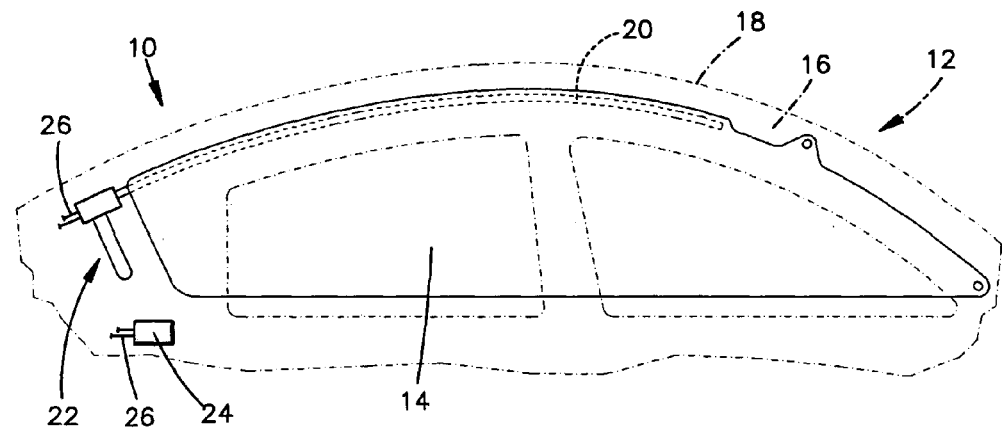
FIG. 1 is a schematic illustration of an apparatus for helping to protect an occupant of a vehicle, according to the present invention.

The present invention relates to an apparatus for helping to protect an occupant of a vehicle. In particular, the present invention relates to an inflator for providing inflation fluid for inflating an inflatable vehicle occupant protection device, such as an inflatable curtain. Representative of the present invention, FIG. 1 illustrates schematically an apparatus 10 for helping to protect an occupant of a vehicle 12.

In the illustrated embodiment, the apparatus 10 comprises an inflatable vehicle occupant protection device in the form of a inflatable curtain 14. The apparatus 10 of the present invention could, however, comprise an inflatable vehicle occupant protection device having an alternative form. For example, the apparatus 10 may comprise an inflatable front impact air bag (driver side or passenger side), a side impact air bag (door, seat, or floor mounted), or an inflatable knee bolster.

The inflatable curtain 14 is mounted adjacent the side structure 16 and a roof 18 of the vehicle 12. A fill tube 20 extends into the inflatable curtain 14. An inflator 22 is actuatable to provide inflation fluid for inflating the inflatable curtain 14. The inflator 22, when actuated, directs inflation fluid into the fill tube 20, which directs inflation fluid into the inflatable curtain 14 to inflate the curtain. The inflatable curtain 14 is inflated from a deflated and stowed condition (not shown) to an inflated condition, as illustrated in FIG. 1. In its inflated condition, the inflatable curtain 14 is positioned between the side structure 16 of the vehicle 12 and a vehicle occupant.

The vehicle 12 includes a sensor 24 for sensing the occurrence of an event for which inflation of the inflatable curtain 14 is desired, such as a side impact to the vehicle and/or a vehicle rollover. The sensor 24 is operable, upon sensing the occurrence of such an event, to provide an electric signal via means 26, such as lead wires, to actuate the inflator 22.

Figure 2:
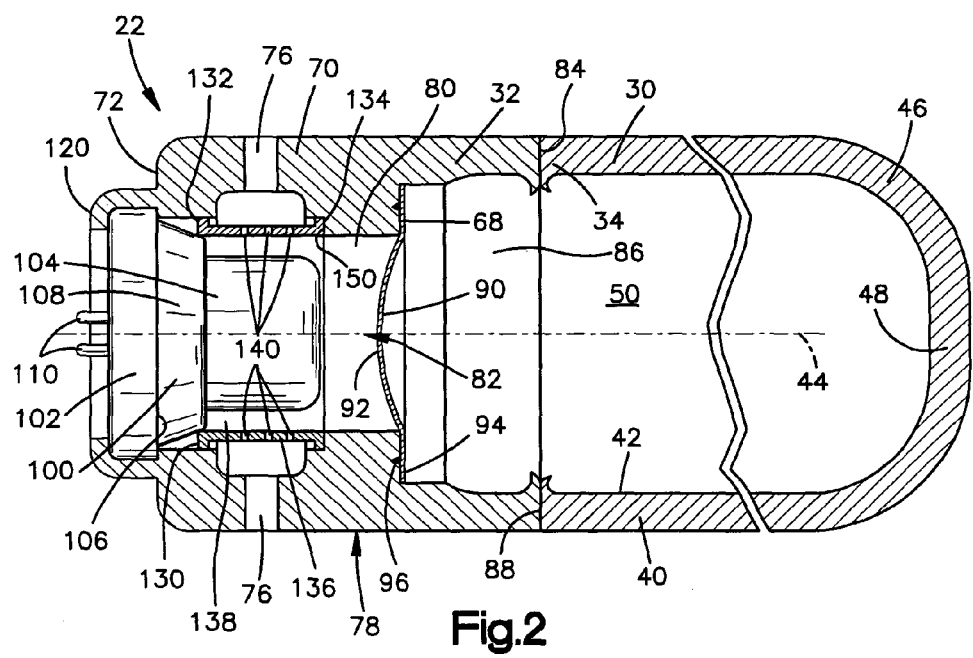
FIG. 2 is an enlarged sectional view of an inflator portion of the apparatus of FIG. 1.
Figure 3:
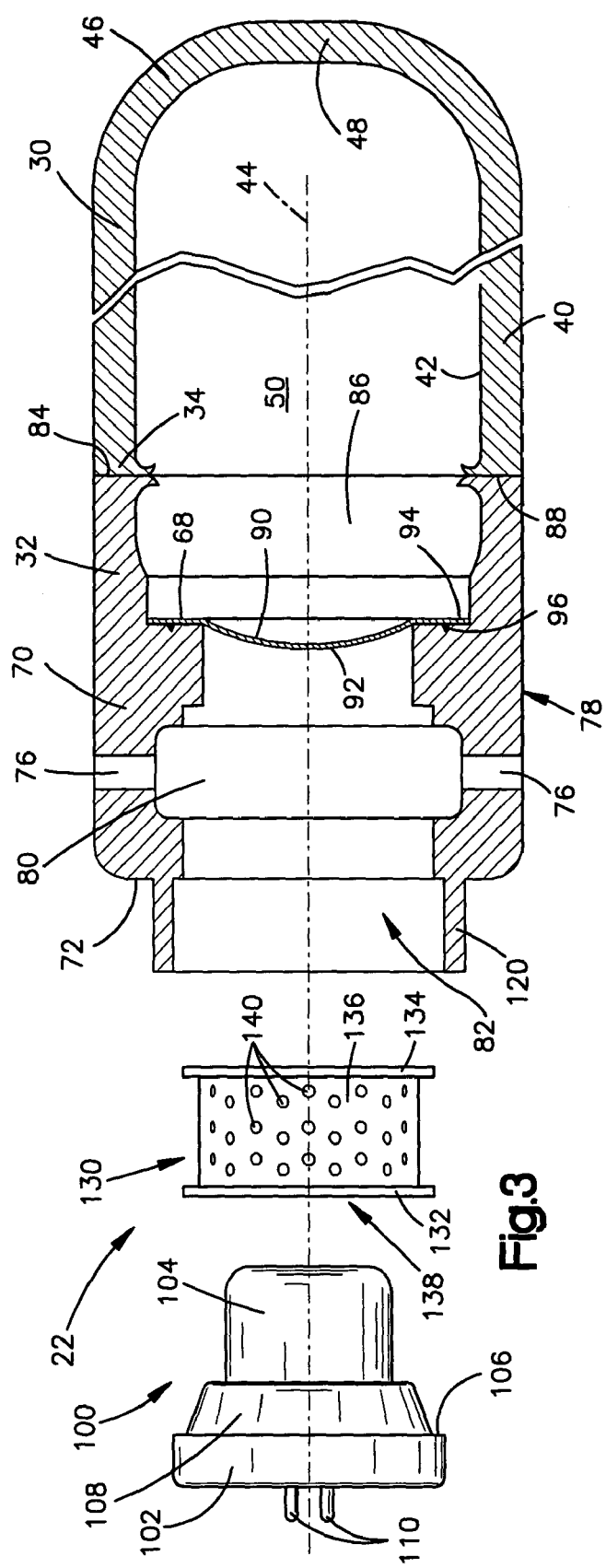
FIG. 3 is an exploded view, partially in section, of the inflator of FIG. 2.

Referring to FIGS. 2 and 3, inflator 22 has a generally cylindrical and elongate configuration and includes a container 30 and an end cap 32. The end cap 32 is affixed to an open first end portion 34 of the container 30 by friction welding. The end cap 32 could, however, be connected to the container 30 in any manner known in the art, such as using laser welds, brazing or screw threads.

The end cap 32 (FIGS. 2 and 3) of the inflator 22 includes an axially extending side wall 70 centered on a longitudinal central axis 44 of the inflator 22. The end cap 32 has a generally cylindrical outer surface 78. An axial bore 82 extends along the axis 44 and through the end cap 32 along its length from a first end surface 72 to an opposite second end surface 84 of the end cap. The axial bore 82 has a diameter that varies along the length of the end cap 32. The side wall 70 thus has a thickness that varies along the length of the end cap 32.

Inflation fluid outlet passages 76 are formed in an annular array in the side wall 70 of the end cap 32. The flow area, number and/or configuration of the outlet passages 76 may be selected to restrict or otherwise control the flow of the inflation fluid into the inflatable curtain 14 (FIG. 1) through the fill tube 20. The fill tube 20 is connected in a known manner to the end cap 32, as illustrated schematically in FIG. 1.

The end cap 32 (FIGS. 2 and 3) includes a surface 68 that extends generally parallel to the first and second end surfaces 72 and 84. A rupturable closure member 90, such as a burst disk, is centered on the axis 44. The closure member 90 has a central dome-shaped first portion 92 and a ring-shaped second portion 94 that encircles the first portion. The second portion 94 extends radially from the first portion 92 and is affixed to the surface 68 of the end cap 32 by a laser weld 96. The closure member 90 could, however, be connected to the surface 68 in any manner well known in the art, such as by brazing, projection welding or electron beam welding.

A second chamber 80, formed in the axial bore 82 of the end cap 32, is centered on the axis 44 and extends axially in the end cap from the first end surface 72 to the closure member 90. The outlet passages 76 provide fluid conductivity from the second chamber 80 through the side wall 70 of the end cap 32. The portion of the side wall 70 extending between the closure member 90 and the second end surface 84 helps define an end chamber 86 of the end cap 32.

The container 30 has a cylindrical configuration including an axially extending cylindrical side wall 40. The side wall 40 has a cylindrical inner surface 42 centered on the axis 44 of the inflator 22. A second end portion 46 of the container is closed by a domed end wall 48.

In the assembled condition of the container 30 and end cap 32, the second end surface 84 of the end cap is fixed to an annular end surface 88 of the container in the manner specified above. In this assembled condition, the end chamber 86 of the end cap 32, in combination with the side wall 40 and end wall 48 of the container 30, comprise structure that defines a first chamber 50 of the inflator 22. The domed portion 92 of the closure member 90 is presented facing concavely toward the first chamber 50 and convexly toward the second chamber 80. The closure member 90 blocks inflation fluid from flowing from the first chamber 50 into the second chamber 80.

The inflator 22 comprises what is referred to in the art as a stored gas inflator, which may also be referred to as a cold gas inflator, in which the first chamber 50 contains inflation fluid stored under pressure. The stored inflation fluid may have a variety of compositions. For example, the inflation fluid may include inert gasses such as helium, nitrogen, argon, or combinations thereof. Characteristic of stored gas inflators, the inflator 22 is free from pyrotechnic material for providing additional inflation fluid, adding heat to the stored inflation fluid, or otherwise augmenting the stored inflation fluid.

The apparatus 10 includes an initiator 100 for rupturing the closure member 90. The initiator 100 may have any construction suitable for rupturing the closure member 90. The initiator 100 illustrated in FIGS. 2 and 3 is illustrative of one such construction.

The initiator 100 is centered on the axis 44 and supported by the end cap 32. The initiator 100 includes a base portion 102 and a cap portion 104, each of which is centered on the axis 44. A frusto-conical flange portion 108 is positioned between the base portion 102 and the cap portion 104 and tapers radially inward from the base portion to the cap portion. The base portion 102 forms an annular rim 106 that extends perpendicular to the axis 44 and engages the first end surface 72 of the end cap 32. The cap portion 104 extends from the base portion 102 into the second chamber 80 of the end cap 32.

The cap portion 104 contains a pyrotechnic material (not shown). A pair of connector pins 110 extend from an end of the initiator 100 opposite the cap portion 104. The lead wires 26 (see FIG. 1) are connectable to the connector pins 110 and thus operatively connect the initiator 100 to the sensor 24.

Figure 4:
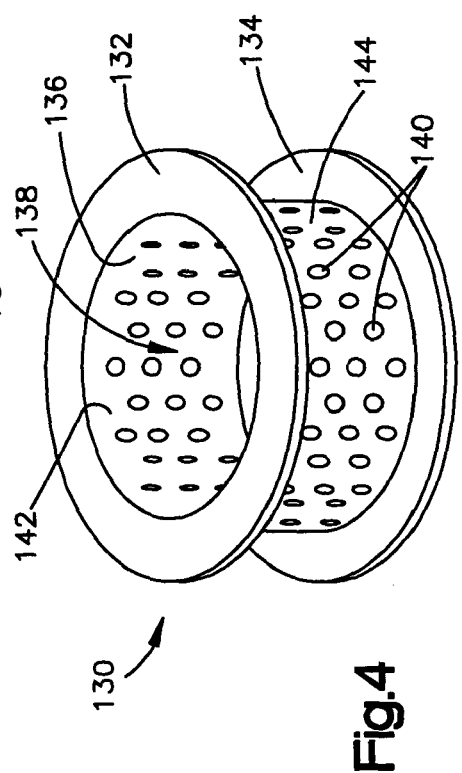
FIG. 4 is an enlarged perspective view of a portion of the inflator of FIG. 2.

The inflator 22 includes a filter 130 centered on the axis 44 and supported in the second chamber 80 of the end cap 32. Referring to FIG. 2–4, the filter 130 of the illustrated embodiment includes a ring-shaped top wall 132, a ring-shaped bottom wall 134, and a cylindrical side wall 136 that extends between the top and bottom walls. The side wall 136 defines a cylindrical space 138 that extends from the top wall 132 to the bottom wall 134. The top wall 132, bottom wall 134 and side wall 136 are centered on the axis 44 when the inflator 22 is assembled. Each of the top wall 132 and bottom wall 134 has an inside diameter and an outside diameter. The side wall 136 has an inside diameter that coincides generally with the inside diameters of the top and bottom walls 132 and 134.

The side wall 136 includes a plurality of apertures 140 that extend through the side wall from an inner surface 142 to an outer surface 144 of the side wall. The number, size, and spacing of the apertures 140, as well as the size of the filter 130 (e.g., diameter and length) may be altered to provide a desired effective flow area and a desired degree of filtration. Although the apertures 140 are illustrated as having a generally cylindrical configuration, the apertures could have any desired shape suited for producing the desired filtering effect.

There are a variety of filter types that may be incorporated into the filter 130 of the present invention. For example, the filter 130 may comprise an expanded metal filter, a perforated sheet filter, a wire mesh filter, a wire fabric filter, or a woven wire filter. The filter 130 may be constructed using a variety of materials, such as carbon steel, stainless steel, zinc and its alloys, aluminum and its alloys, magnesium and its alloys, ceramics, and plastics (e.g., reinforced plastics). As a further example, the filter 130 could be constructed of any suitable rigid material, such as metals, metal alloys, plastics, composites, or combinations thereof. The filter 130 may be formed using a variety of fabricating techniques, such as machining, stamping, forging, casting, impacting, or extrusion. The top wall 132, bottom wall 134, and side wall 136 may be constructed as a single piece of material or may be constructed as separate pieces of material that are connected, e.g., by welding, to form the filter 130.

The end cap 32 includes an annular rim portion 120 that extends from the first end surface 72. Referring to FIG. 3, prior to assembly of the inflator 22, the rim portion 120 projects from the first end surface 72 in a direction generally parallel to the axis 44. To assemble the inflator 22, the filter 130 is moved along the axis 44 and inserted in the second chamber 80 such that the bottom wall 134 engages an annular shoulder 150 formed on the side wall 70.

Next, the initiator 100 is moved along the axis 44 and inserted in the second chamber 80 such that the rim portion 106 engages the first end surface 72 of the end cap 32. While this occurs, the flanged portion 108 engages the filter 130 at or near the intersection of the top wall 132 and the side wall 136 of the filter. The cap portion 104 is thus disposed in the cylindrical space 138 defined by the side wall 136 of the filter 130. The rim portion 120 is then crimped around the base portion 102 of the initiator 100 to hold or clamp the initiator against the first end surface 72. Alternatively, the initiator 98 may be welded to the end cap 32 to retain the initiator and the filter 130 in the end cap.

Advantageously, the filter 130 is clamped in the second chamber 80 between the shoulder portion 150 of the end cap 32 and the flange portion 108 of the initiator 100. This eliminates the need to provide a filter, separate from the inflator 22, that is connected or otherwise positioned externally of the inflator 22. According to the present invention, the filter 130 forms a component assembled with the end cap 32 and thereby becomes an integral component of the assembled inflator 22.

Upon receiving of an electric signal from the sensor 24, the initiator 100 is actuated in a known manner. Upon actuation of the initiator 100, the pyrotechnic material in the cap portion 104 is ignited, which causes the cap portion to rupture. Ignition of the pyrotechnic material creates forces that act on the dome-shaped first portion 92 of the closure member 90, causing the closure member to rupture.

The pyrotechnic material of the initiator 100 is solely for providing a means for rupturing the closure member 90. The pyrotechnic material of the initiator 100 does not provide a significant amount of additional inflation fluid and does not heat or otherwise augment the stored inflation fluid. The stored inflation fluid is sufficient by itself to inflate the inflatable curtain and maintain the curtain in an inflated condition for the desired duration.

Rupture of the closure member 90 permits flow of the inflation fluid from the first chamber 50 of the container 30 into the second chamber 80 of the end cap 32. The inflation fluid passes through the apertures 140 in the side wall of the filter 130 and exits the end cap 32 through the outlet passages 76. The filter 130 helps prevent particulates resulting from actuation of the initiator 100, such as combustion byproducts and pieces of the ruptured end cap, from escaping the inflator 22. The particulates filtered by the filter 130 are of a size predetermined by the construction of the filter.

From the above description of the invention, those skilled in the art will perceive improvements, changes and modifications. For example, although the inflator has been illustrated herein as a stored gas inflator, the filter configuration of the present invention could be applied to alternative inflator types, such as pyrotechnic, augmented, and hybrid. Such improvements, changes and modifications within the skill of the art are intended to be covered by the appended claims.

Having described the invention, the following is claimed:

1. An inflator comprising:

a structure defining first and second chambers, said first chamber being for containing a volume of fluid under pressure wherein said fluid comprises a non-pyrotechnic material, said second chamber being in fluid communication with an outlet passage for directing fluid from the inflator;

a closure member openable to release said fluid to flow out of said first chamber;

an initiator actuatable to open said closure member; and a filter disposed in said second chamber, wherein said filter comprises a ring-shaped top wall, a ring shaped bottom wall, and a cylindrical side wall extending between said top wall and said bottom wall, said side wall including a plurality of apertures through which said fluid flows to said outlet passage, wherein said ring shaped top wall and said ring shaped bottom wall project radially beyond said cylindrical side wall, said top wall of said filter engaging an annular portion of said initiator and said bottom wall engaging an annular surface in said second chamber, said initiator urging said bottom wall against said annular surface to clamp said filter in said second chamber between said initiator and said annular surface said fluid being directed from said first chamber into said second chamber and through said filter into said outlet passage upon opening of said closure member.

2. The inflator as recited in claim 1, wherein said cylindrical side wall of said filter defines a cylindrical space extending from said top wall to said bottom wall, said initiator including a cap portion extending at least partially into said cylindrical space.

3. The inflator as recited in claim 1, wherein said first and second chambers are aligned with each other along an axis of the inflator, said fluid flowing from said first chamber into said second chamber in a direction parallel to said axis, said fluid flowing perpendicular to said axis through said outlet passage.

4. The inflator as recited in claim 1, wherein said structure comprises:
   a container having an open end and an opposite closed end; and
   an end cap fixed to said open end of said container, said first chamber being defined within said container and extending into said end cap, said second chamber being defined in said end cap, said closure member being fixed to an inner surface of said end cap and separating said first and second chambers.

5. The inflator as recited in claim 4, wherein said container comprises a cylindrical side wall having an outside diameter, said end cap comprising a side wall with a cylindrical outer surface having an outside diameter about equal to the outside diameter of said container, said container and said end cap being aligned with each other along a common axis, said side wall of said end cap having a varying wall thickness, a portion of said side wall of said end cap forming an annular surface to which said closure member is fixed, said outlet passage extending perpendicular to said axis from said second chamber through said side wall of said end cap.

6. The inflator as recited in claim 5, wherein said end cap including an annular rim portion crimped onto said initiator to urge said initiator against said top wall and urge said bottom wall against said annular surface to clamp said filter in said second chamber between said initiator and said annular surface.

7. The inflator as recited in claim 1, wherein said closure member comprises a burst disk rupturable to release said inflation fluid to flow from said container.

8. An inflator actuatable to provide inflation fluid for inflating an inflatable vehicle occupant protection device, said inflator comprising:
   a container portion comprising a first chamber for containing a volume of inflation fluid under pressure wherein said inflation fluid comprises a non-pyrotechnic material;
   a closure member openable to release said inflation fluid to flow out of said first chamber;
   an output portion for directing said inflation fluid into said inflatable vehicle occupant protection device, said output portion comprising a second chamber into which said inflation fluid is directed from said first chamber and an outlet passage through which said inflation fluid is directed from said second chamber into the inflatable vehicle occupant protection device;
   a filter disposed in said second chamber, said inflation fluid being directed from said first chamber into said second and through said filter into said outlet passage upon opening of said closure member; and
   an initiator actuatable to open said closure member, said initiator being disposed in said second chamber and engaging a first portion of said filter, a second portion of said filter engaging a surface in said second chamber, said initiator being urged against said first portion which urges said second portion against said surface to clamp said filter in said chamber between said initiator and said surface, wherein said first portion of said filter comprises a ring shaped top wall of said filter and said second portion of said filter comprises a ring shaped bottom wall of said filter, said filter further comprising a cylindrical side wall extending between said top wall and said bottom wall, said side wall comprising a plurality of apertures through which said inflation fluid flows from said second chamber to said outlet passage, wherein said ring shaped top wall and said ring shaped bottom wall project radially beyond said cylindrical side wall.

9. An inflator actuatable to provide inflation fluid for inflating an inflatable vehicle occupant protection device, said inflator comprising:
   container means comprising a first chamber for containing a volume of inflation fluid under pressure, wherein said inflation fluid comprises a non-pyrotechnic material said container means having a closure member openable to release said inflation fluid to flow out of said first chamber;
   initiator means actuatable to open said closure member;
   output means for directing said inflation fluid into said inflatable vehicle occupant protection device, said output means comprising a second chamber into which said inflation fluid is directed from said first chamber and an outlet passage through which said inflation fluid is directed from said second chamber into the inflatable vehicle occupant protection device; and
   filter means disposed in said second chamber between said initiator means and a surface of said output means, a portion of said output means being deformed onto said initiator means to urge said initiator means into said second chamber to clamp said filter means between said initiator means and said surface of said output means, said inflation fluid being directed from said first chamber into said second chamber and through said filter means into said outlet passage upon opening of said closure member, wherein said filter means comprises a ring-shaped top wall, a ring shaped bottom wall, and a cylindrical side wall extending between said top wall and said bottom wall, said side wall including a plurality of apertures through which said fluid flows to said outlet passage, wherein said ring shaped top wall and said ring shaped bottom wall project radially beyond said cylindrical side wall, said top wall of said filter engaging an annular portion of said initiator and said bottom wall engaging an annular surface in said second chamber.

10. An apparatus for helping to protect an occupant of a vehicle that has a side structure, said apparatus comprising:
   an inflatable vehicle occupant protection device that is inflatable between the side structure of the vehicle and a vehicle occupant;
   a container for storing under pressure inflation fluid for inflating the inflatable vehicle occupant protection device, wherein said inflation fluid comprises a non-pyrotechnic material;
   a closure member openable to release said inflation fluid to flow from said container;
   output means including a chamber into which said inflation fluid flows from said container when said closure member is ruptured, said output means further including an outlet passage through which said inflation flows from said chamber toward said inflatable vehicle occupant protection device;
   an initiator actuatable to rupture said closure member; and
   a filter disposed in said chamber, said inflation fluid being directed from said container into said chamber and through said filter into said outlet passage upon opening of said closure member, wherein said filter comprises a ring-shaped top wall, a ring shaped bottom wall, and a cylindrical side wall extending between said top wall and said bottom wall, said side wall including a plurality of apertures through which said fluid flows to said outlet passage, wherein said ring shaped top wall and said ring shaped bottom wall project radially beyond said cylindrical side wall, said top wall of said filter engaging an annular portion of said initiator and said bottom wall engaging an annular surface in said second chamber, said initiator urging said bottom wall against said annular surface to clamp said filter in said second chamber between said initiator and said annular surface.

11. Apparatus as defined in claim 10, further comprising a fill tube arranged in fluid conductivity with said outlet passage and having a portion located in said inflatable vehicle occupant protection device, said fill tube being for delivering said inflation fluid from said inflator into said inflatable vehicle occupant protection device to inflate said inflatable vehicle occupant protection device.

* * * * *